(12) United States Patent
Stille

(10) Patent No.: US 8,801,380 B2
(45) Date of Patent: Aug. 12, 2014

(54) CONCENTRIC ROTOR CONTROL SYSTEM

(75) Inventor: Brandon L. Stille, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 766 days.

(21) Appl. No.: 13/036,320

(22) Filed: Feb. 28, 2011

(65) Prior Publication Data
US 2011/0211953 A1 Sep. 1, 2011

Related U.S. Application Data

(60) Provisional application No. 61/309,108, filed on Mar. 1, 2010.

(51) Int. Cl.
*B64C 27/605* (2006.01)

(52) U.S. Cl.
USPC .................................................. 416/163

(58) Field of Classification Search
CPC ........ B64C 27/605; B64C 7/625; B64C 7/78; B64C 7/80
USPC .................... 416/149, 150, 159, 164
See application file for complete search history.

(56) References Cited

U.S. PATENT DOCUMENTS 3,080,002 A * 3/1963 Du Pont ..................... 416/102
4,573,873 A * 3/1986 Yao et al. .................... 416/114

* cited by examiner

*Primary Examiner* — Nathaniel Wiehe
*Assistant Examiner* — Jeffrey A Brownson
(74) *Attorney, Agent, or Firm* — Cantor Colburn LLP

(57) ABSTRACT

A rotor control system including a collective control rod positioned internal to a rotor shaft, the rotor shaft for imparting torque to rotor blades; and a cyclic control rod positioned internal to and concentric with the collective control rod.

6 Claims, 3 Drawing Sheets

CONCENTRIC ROTOR CONTROL SYSTEM

CROSS-REFERENCE TO RELATED APPLICATIONS

This application claims the benefit of U.S. provisional patent application Ser. No. 61/309,108 filed Mar. 1, 2010, the entire contents of which are incorporated herein by reference.

BACKGROUND OF THE INVENTION

The subject matter disclosed herein relates to the art of rotor control and, more specifically, to a concentric rotor control system.

A number of different types of aircraft use rotors to impart motion to the aircraft, including tilt-wing, tilt-rotor and dual counter-rotating rotor blade aircraft. The rotor blades are typically controlled through cyclic control and collective control. Main rotor pitch control is typically achieved through a swashplate assembly that transfers motion of non-rotating control members to rotating control members. The swashplate assembly is typically concentrically mounted about a rotor shaft. A typical swashplate assembly includes two rings connected by a series of bearings. One ring is mounted to the aircraft (stationary) and another ring is mounted to a hub portion of the rotor shaft (rotating). Movements in the stationary ring are transferred to the rotating ring to control blade pitch.

Existing aircraft (e.g., tilt-rotor, tilt-wing, dual counter-rotating rotor blade) often have limited space between the transmission and rotor. Thus, providing collective and cyclic rotor control can be difficult in such limited space. A compact rotor control system would be well received in the art.

BRIEF DESCRIPTION OF THE INVENTION

According to one aspect of the invention, a rotor control system includes a collective control rod positioned internal to a rotor shaft, the rotor shaft for imparting torque to rotor blades; and a cyclic control rod positioned internal to and concentric with the collective control rod.

According to another aspect of the invention a method for providing collective control and cyclic control to a rotor, includes: receiving flight inputs; and actuating at least one of a first servo and a second servo in response to the flight inputs; wherein the first servo is coupled to a collective control rod positioned internal to a rotor shaft, the rotor shaft for imparting torque to rotor blades; and the second servo is coupled to a cyclic control rod positioned internal to and concentric with the collective control rod.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
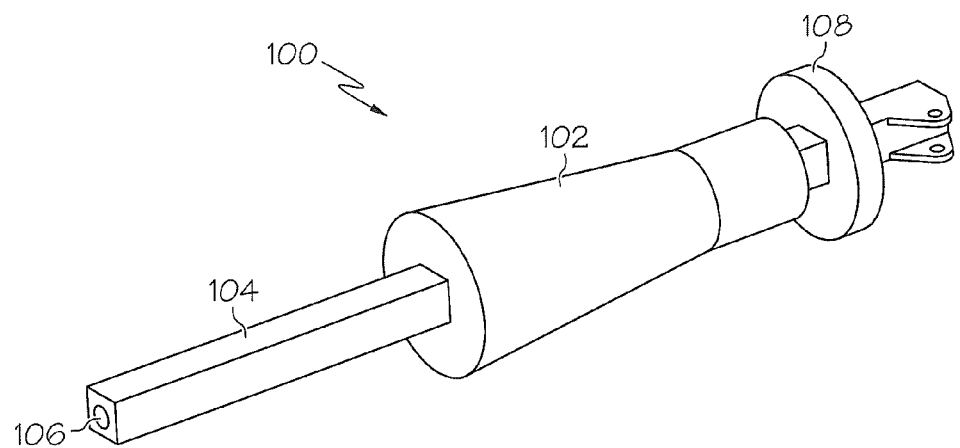
FIG. 1 is a perspective view of a portion of a rotor control system in an exemplary embodiment.

FIG. 1 is a perspective view of a portion of a rotor control system 100 in an exemplary embodiment. Rotor control system 100 includes a rotor shaft 102 for imparting torque to rotor blades (not shown for clarity). Running through rotor shaft 102 is a collective control rod 104. The collective control rod 104 is concentric to rotor shaft 102 and has a longitudinal axis parallel to the longitudinal axis of rotor shaft 102. The collective control rod 104 can translate along its longitudinal axis relative to rotor shaft 102. The collective control rod 104 can also freely rotate relative to the rotor shaft 102 about the longitudinal axis. The collective control rod 104 travels linearly and turns freely within rotor shaft 102. Collective control rod 104 includes a through-bore 106 extending on its longitudinal axis for receiving a cyclic control rod as described herein.

Figure 2:
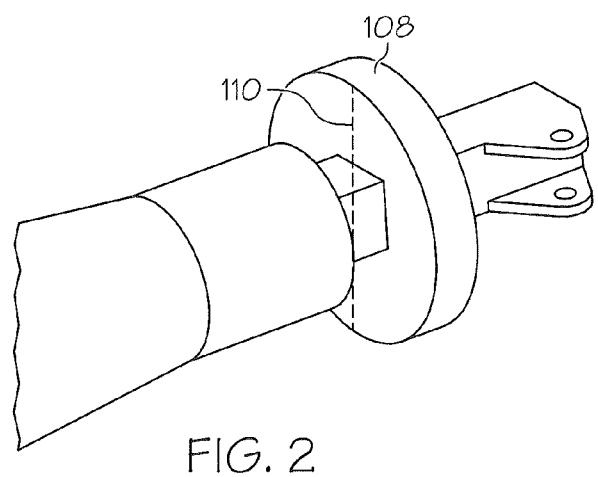
FIG. 2 is a perspective view of a portion of FIG. 1.

A stationary, first swashplate 108 is pivotally affixed at a first distal end of the collective control rod 104. As shown in FIG. 2, the first swashplate 108 is pivotally affixed to the collective control rod 104 through a pin 110, perpendicular to the collective control rod 104. As described in further detail herein, the orientation of pin 110 may be altered by rotating the collective control rod 104 around its longitudinal axis. First swashplate 108 tilts about pin 110 in response to the cyclic control rod as described herein. First swashplate 108 travels with the collective control rod 104 along the longitudinal axis of the collective control rod 104.

Figure 3:
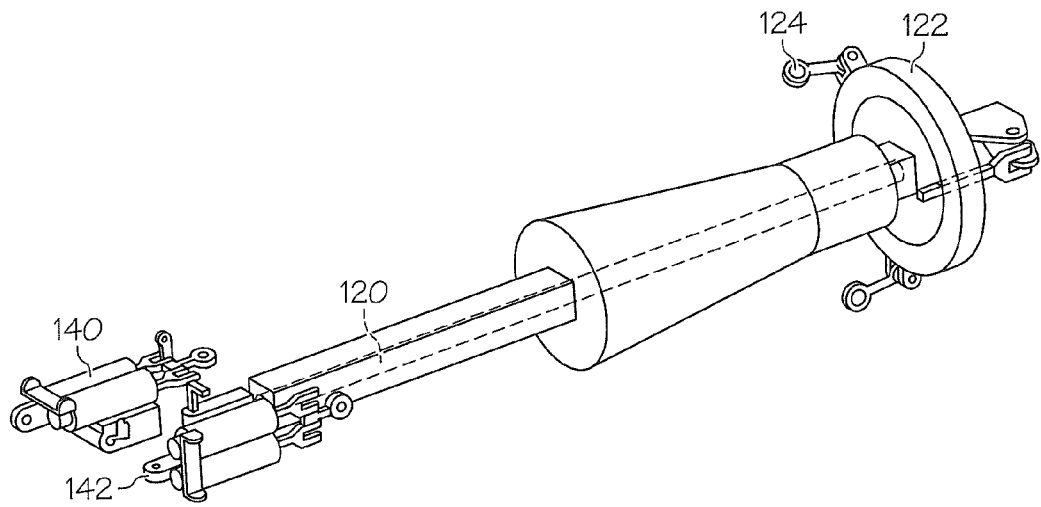
FIG. 3 is a perspective view of a rotor control system in an exemplary embodiment.
Figure 4:
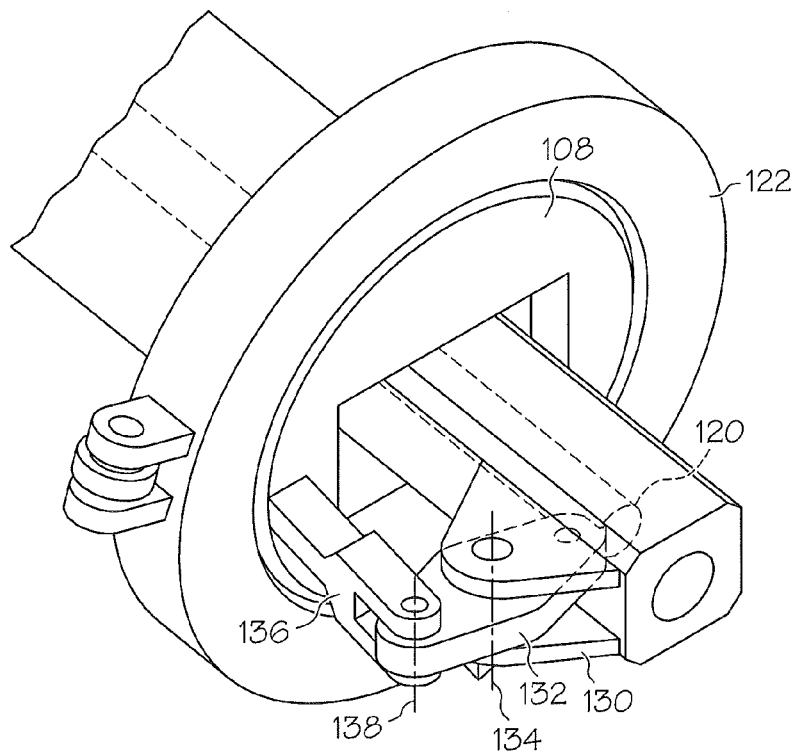
FIG. 4 is a perspective view of a portion of FIG. 3.

FIGS. 3 and 4 are perspective views of the rotor control system 100 depicting the cyclic control rod 120. The cyclic control rod 120 extends through through-bore 106 in collective control rod 104. The cyclic control rod 120 has a longitudinal axis parallel to the longitudinal axis of the collective control rod 104. The cyclic control rod 120 can translate relative to collective control rod 104 and translate relative to the rotor shaft 102. The cyclic control rod 120 also rotates with the collective control rod 104 about the longitudinal axis of the collective control rod 104.

FIG. 3 illustrates a rotating, second swashplate 122. The second swashplate 122 is coupled to the first swashplate 108 through a bearing as known in the art. The second swashplate 122 rotates with rotor blades (not shown) and includes pitch links 124 for collectively adjusting the pitch of the rotor blades.

FIG. 4 illustrates the connection between the cyclic control rod 120 and the first swashplate 108. The collective control rod 104 includes a mount 130. A linkage includes a pivot link 132 pivotally mounted to the mount 130 via a pin 134. One end of the pivot link 132 is coupled to a first distal end of the cyclic control rod 120. The other end of the pivot link 132 is pivotally connected to a cyclic pitch link 136 at pin 138. The cyclic pitch link 136 is also pivotally connected to the first swashplate 108.

In operation, movement of the collective control rod 104 causes the first swashplate 108 and second swashplate 122 to travel along the longitudinal axis of the collective control rod 104. Such movement causes the second swashplate 122 to collectively apply force on pitch links 124 to collectively control rotor blade pitch. Translation of the cyclic control rod 120 relative to the collective control rod 104 causes the first swashplate 108 and the second swashplate 122 to tilt about pin 110 to provide cyclic control.

A first servo 140 is coupled to the collective control rod 104. A second servo 142 is coupled to the cyclic control rod 120. In response to a controller 150 (FIG. 5), first servo 140 and second servo 142 translate the collective control rod 104 and the cyclic control rod 120 as needed. For example, to provide collective control, first servo 140 translates the collective control rod 104 relative to rotor shaft 102 to apply force on pitch links 124 collectively. As movement of the collective control rod 104 by itself will create a cyclic input, cyclic control rod 120 is also moved by servo 142 to control any cyclic input to the first swashplate 108. If only two servos 140 and 142 are used, the cyclic control is referred to as mono-cyclic control, because the orientation of the pin 110 remains constant.

Pin 110 defines the axis about which the first swashplate 108 and second swashplate 122 tilt. The orientation of pin 110 determines the nature of the cyclic control. For example, in a helicopter, cyclic control can be lateral (i.e., roll) or longitudinal (i.e., pitch). Changing the orientation of pin 110 allows the first swashplate 108 and the second swashplate 122 to tilt about a different axis enabling different forms of cyclic control.

Using two servos allows for relative translation of the collective control rod 104 and the cyclic control rod 120, with respect to each other and the rotor shaft 102. A third servo 144 may be used to rotate the collective control rod 104 (along with the cyclic control rod 120) about the longitudinal axis of the collective control rod 104 to change the orientation of pin 110. Changing the orientation of pin 110 enables full cyclic rotor control (pitch, roll), along with collective rotor control provided by collective control rod 104.

Figure 5:
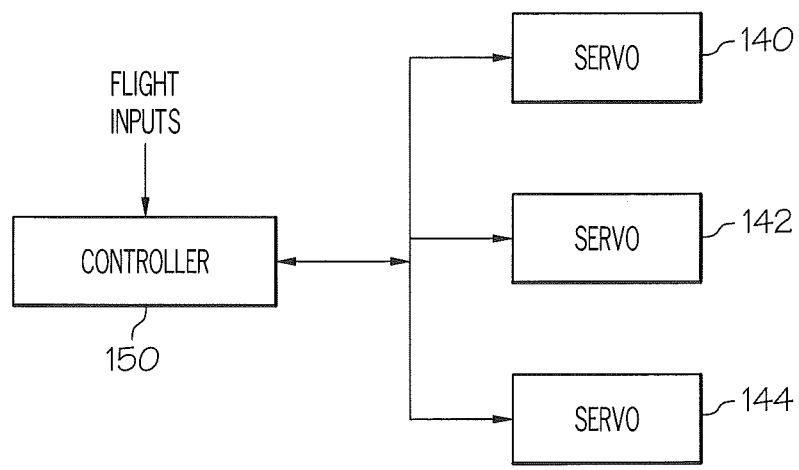
FIG. 5 is a block diagram of an exemplary control system.

FIG. 5 illustrates an exemplary control system. A controller 150 receives flight inputs and generates the appropriate servo control signals. Servos 140 and 142 are shown for translating the collective control rod 104 and the cyclic control rod 120, respectively, as described above. Servo 144 is used for rotating the collective control rod 104 (along with the cyclic control rod 120) about the longitudinal axis of the collective control rod 104, in order to alter the orientation of pin 110, as described above. Controller 150 may be implemented using a variety of devices, including a microprocessor(s) executing program code to carry out the functions described herein, hardware, firmware, ASIC(s) or other functional equivalents. Controller 150 drives servos 140, 142 and 144 to apply the appropriate collective and cyclic forces to the rotor blades.

In operation, the controller 150 receives flight inputs and determines whether one or more of servos 140, 142 and 144 need to be activated. Servos 140, 142 and 144 can operate bi-directionally (e.g., servo 144 can rotate collective control rod 104 clockwise or counter-clockwise). For example, if only collective control is desired, servos 140 and 142 can be activated to translate the collective control rod 104 and cyclic control rod 120 at the same time to produce a collective pitch adjustment. It is understood that one, two or all three servos 140, 142 and 144 may be activated to provide full collective and cyclic rotor control.

Embodiments of the invention employ concentric collective and cyclic control rods, requiring little space (and internal to the rotor shaft). The concentric control rods are positioned within the rotor shaft, freeing up valuable space around the front of the transmission. Additionally, the servos can be mounted at the back of the transmission, allowing the use of less restrictive servo designs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor control system comprising:
   a collective control rod positioned internal to a rotor shaft, the rotor shaft for imparting torque to rotor blades;
   a cyclic control rod positioned internal to and concentric with the collective control rod;
   a first swashplate pivotally attached to the collective control rod;
   a second swashplate rotating relative to the first swashplate about a bearing; and
   a linkage coupling the first swashplate to the cyclic control rod, translation of the cyclic control rod relative to the collective control rod causing the first swashplate to pivot;
   the linkage is supported on a mount provided on the collective control rod.

2. The rotor control system of claim 1 wherein:
   the linkage includes a pivot link pivotally attached to the mount and a cyclic pitch link having one end pivotally coupled to the pivot link and a second end pivotally connected to the first swashplate.

3. The rotor control system of claim 1 further comprising:
   a first servo translating the collective control rod relative to the rotor shaft;
   a second servo translating the cyclic control rod relative to the collective control rod;
   a controller providing control signals to the first servo and the second servo.

4. A rotor control system comprising:
   a collective control rod positioned internal to a rotor shaft, the rotor shaft for imparting torque to rotor blades;
   a cyclic control rod positioned internal to and concentric with the collective control rod;
   a first swashplate pivotally attached to the collective control rod;
   a second swashplate rotating relative to the first swashplate about a bearing;
   a first servo translating the collective control rod relative to the rotor shaft;
   a second servo translating the cyclic control rod relative to the collective control rod; and
   a controller providing control signals to the first servo and the second servo;
   a third servo rotating the collective control rod about a longitudinal axis of the collective control rod to change the orientation of the first swashplate.

5. The rotor control system of claim 4 wherein:
   the cyclic control rod rotates with the collective control rod about the longitudinal axis.

6. A method for providing collective control and cyclic control to a rotor, the method comprising:
   receiving flight inputs; and
   actuating at least one of a first servo and a second servo in response to the flight inputs; wherein, the first servo is coupled to a collective control rod positioned internal to a rotor shaft, the rotor shaft for imparting torque to rotor blades; and the second servo is coupled to a cyclic control rod positioned internal to and concentric with the collective control rod;

wherein a first swashplate is pivotally attached to the collective control rod and a second swashplate rotates relative to the first swashplate about a bearing;

the method including actuating a third servo to change the orientation of the first swashplate to provide full cyclic control to the rotor.

\* \* \* \* \*